Feb. 13, 1945.   C. D. PETERSON ET AL   2,369,369
POWER TRANSMISSION
Filed July 8, 1938   2 Sheets-Sheet 2
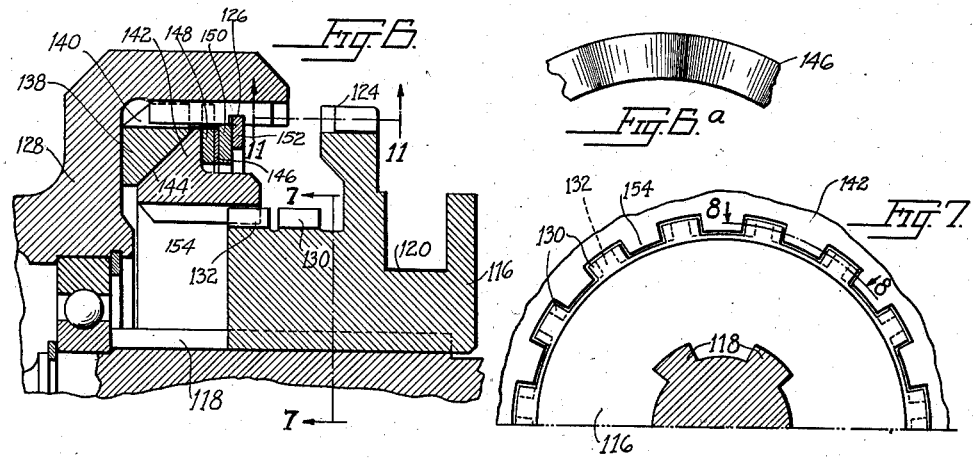
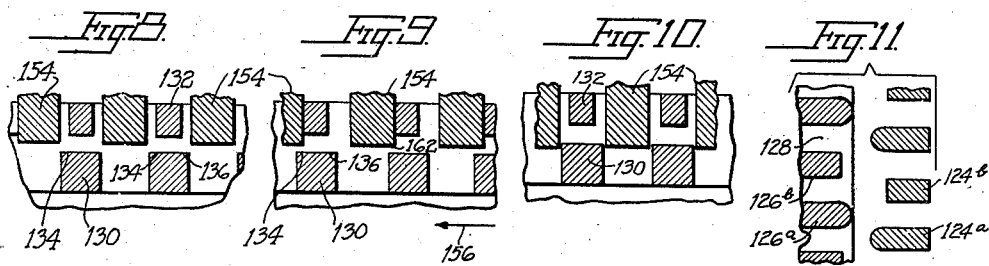
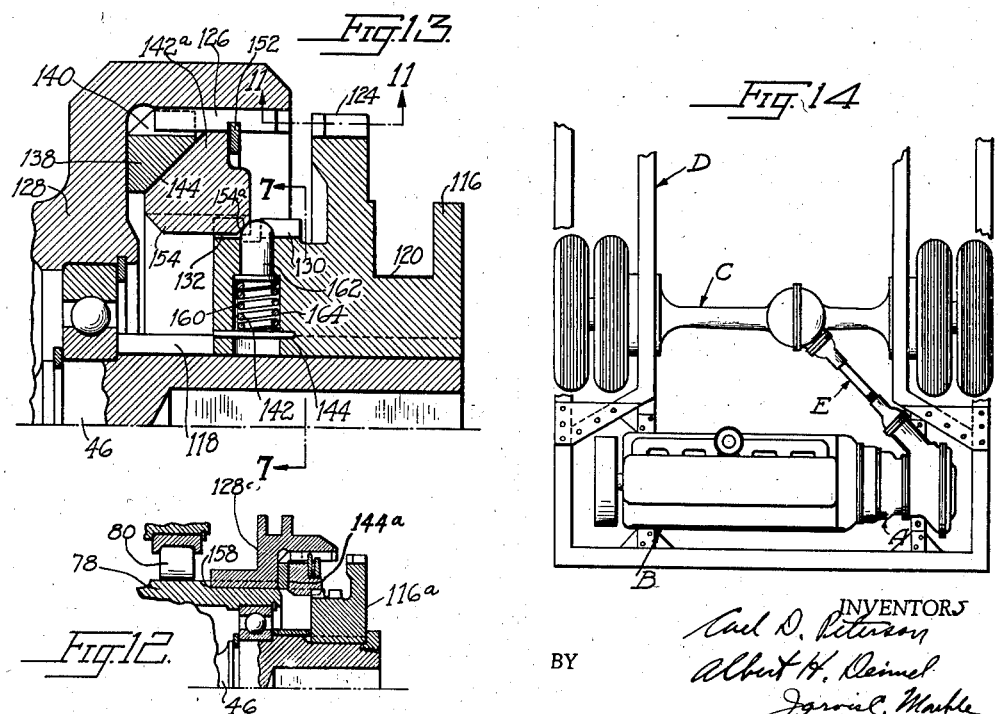
INVENTORS
Carl D. Peterson
Albert H. Deimel
Jerome C. Marble
THEIR ATTORNEY.

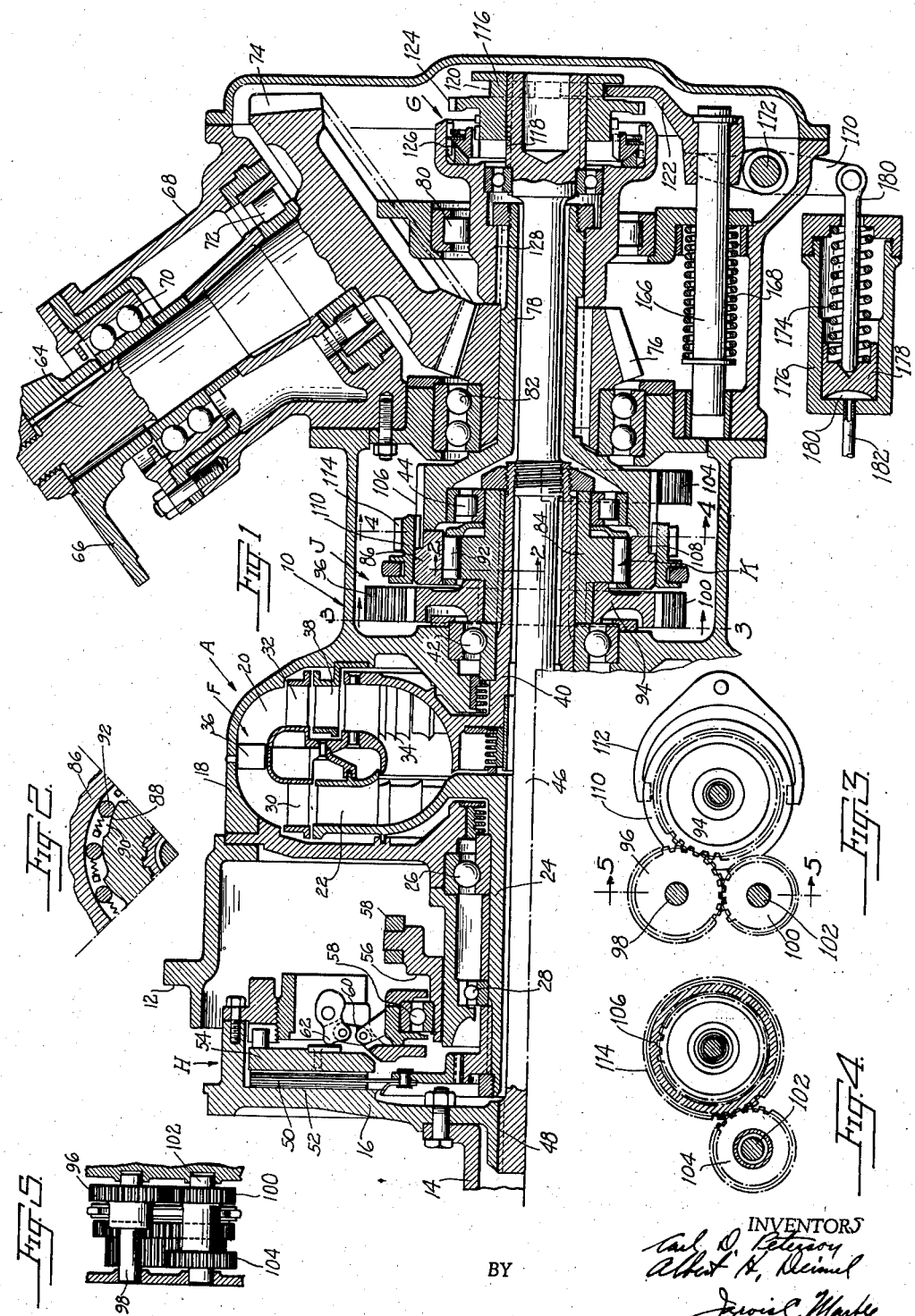

Patented Feb. 13, 1945

2,369,369

UNITED STATES PATENT OFFICE 2,369,369

POWER TRANSMISSION

Carl D. Peterson and Albert H. Deimel, Toledo, Ohio, assignors to Spicer Manufacturing Corporation, Toledo, Ohio, a corporation of Virginia Application July 8, 1938, Serial No. 218,044

8 Claims. (Cl. 74—189.5)

The present invention relates to power transmission, especially for the propulsion of vehicles, and has particular reference to power transmissions embodying alternative drives in which a low variable speed drive is provided by torque multiplying hydraulic variable speed mechanism, hereinafter referred to as a torque converter, and a higher speed drive proportional, or substantially proportional, to the speed of operation of the source of power is provided for higher speed operation of the vehicle or other driven apparatus.

Still more particularly, the invention relates to power transmission units for providing low speed hydraulic drive and high speed direct drive of the kind disclosed in Patent No. 1,900,119, granted to Alf Lysholm, et al., March 7, 1933.

In one of its aspects, the invention has for a principal object the provision of a power transmitting unit in which hydraulic and direct drive features are incorporated and which is applicable in installations, such as transverse rear engine installations in automotive vehicles, wherein the space available for the unit is severely limited as to axial length when the amount of power required to be developed and transmitted through the transversely positioned unit is taken into consideration. Another of the objects of this aspect of the invention is the provision of a novel arrangement of hydraulic and high speed drive mechanism in combination with reverse mechanism, enabling the reversing mechanism to be associated directly with the hydraulic mechanism so as to operate at the same speed as the latter mechanism and to consequently be of minimum size and weight, without necessitating lengthening the apparatus to the extent usually required by the addition of a separately applied unit reverse gear.

Still another object of this aspect of the invention is the provision of improved construction providing for hydraulic and high speed drives in alternation in a unit adapted to provide so-called angle drive for rear engine installations and further to provide a novel form of construction in which the high speed clutch is arranged in relation to the remaining parts of the apparatus so as to be readily accessible for adjustment, repair, and replacement without the necessity for disturbing other parts of the apparatus.

In another of its aspects, the invention has for a principal object the provision of a power transmitting unit of the character described in which positively engaging clutch means is employed for effecting the high speed drive, and in still another of its aspects the invention has for a principal object the provision of a novel clutch means of the positively engaging type capable of engagement to transmit power from a driving to a driven member while both the driving and the driven members are under load.

Other and more detailed objects of the invention, together with its more specific nature and the advantages to be derived from its use, will best be understood from a consideration of the following portion of this specification, taken in conjunction with the accompanying drawings forming a part hereof, in which:

Fig. 1 is a longitudinal central section of a power transmission embodying the invention;

Fig. 2 is a view taken on the line 2—2 of Fig. 1;

Fig. 3 is a view taken on the line 3—3 of Fig. 1;

Fig. 4 is a view taken on the line 4—4 of Fig. 1;

Fig. 5 is a view taken on the line 5—5 of Fig. 3;

Fig. 6 is a partial section on enlarged scale of part of the apparatus shown in Fig. 1;

Fig. 6a is a side elevation of a portion of one of the parts shown in Fig. 6.

Fig. 7 is a section taken on the line 7—7 of Fig. 6;

Fig. 8 is a fragmentary section taken on the line 8—8 of Fig. 7;

Figs. 9 and 10 are views similar to Fig. 8 showing the parts in different positions;

Fig. 11 is a partial section taken on the line 11—11 of Fig. 6;

Fig. 12 is a view similar to Fig. 6 showing a different form of construction of the high speed clutch, Fig. 13 is a view showing still another form of clutch construction; and Fig. 14 is a more or less diagrammatic view showing an installation arrangement of the power transmission shown in Fig. 1 in a motor vehicle having a rear engine drive.

Referring now to Figs. 1 and 14, I have shown by way of example a power transmission unit, indicated generally at A, providing the means for transmitting power from Engine B to the driving axle C of an automotive vehicle the frame of which is indicated at D. In the installation illustrated, the arrangement is that commonly employed for rear engine drive vehicles, with the driving connection between the transmission unit A and axle C through an angled propeller shaft E. It will be understood, however, that the utility of the present invention is not limited to apparatus embodied in this specific arrangement, which is illustrated only by way of example.

The transmission unit shown in Fig. 1 comprises a housing indicated generally at 10 and having a flanged housing part 12 adapted to be connected directly to the crank case or bell housing of an internal combustion or other type of engine having a crank shaft 14 and fly wheel 16.

The part 18 of housing 10 serves to provide the working chamber of a hydraulic torque converter F, preferably of the type disclosed in United States Letters Patent No. 1,900,119, previously referred to. In this type power is transmitted through the medium of working liquid circulated in a closed path of flow in a working chamber 20. The liquid is circulated by means of a pump member having a ring of impeller blades 22 located in chamber 20 and a hollow shaft part 24 rotatably carried by bearings 26 and 28 mounted in the casing structure.

Power is delivered by the circulating liquid to the driven or turbine member which has a plurality of rings or stages of turbine blades located in the working chamber. In the embodiment illustrated there are three such stages, 30, 32, and 34, between which are located respectively the rows of fixed or reaction guide blades 36 and 38. The rows of guide blades are carried by the casing structure.

The turbine member also comprises a hollow shaft part 40 rotatably mounted in a bearing 42 in the housing structure and a bearing 44 located in a part hereinafter to be described.

The specific structure of the hydraulic torque converter mechanism may vary widely within the scope of the invention both as to number of stages and details of construction.

The central passage provided by the hollow shaft parts 24 and 40 of the pump and turbine members respectively provides for the reception of a high speed shaft 46 which in the present embodiment is in the form of a direct drive shaft splined at 48 to the hub of the engine fly wheel.

This shaft is adapted to be connected through the medium of a high speed clutch G, hereinafter more fully described, to the final drive shaft of the transmission unit which is adapted to be connected to the propeller shaft E.

The pump member of the torque converter F is releasably connected to the engine crank shaft by means of a friction clutch H which may be of any suitable design and which in the present instance has been shown as built into the engine fly wheel. In the clutch illustrated, a friction plate 50 secured to the pump shaft 24 is arranged to be engaged between the pressure face 52 on the engine fly wheel and an axially shiftable pressure plate 54. Plate 54 is engaged and released through the medium of the shift sleeve 56 actuated by any suitable fork 58. In the construction shown, sleeve 56 is connected through bearing 58 to linkage indicated generally at 60 which serves to operate the cam 62. In the drawings the clutch is shown in engaged position and as will be evident therefrom, movement of the shift fork 58 to the right will serve to release the clutch.

In the type of apparatus illustrated, final drive from the unit is delivered through an angularly arranged pinion shaft 64 carrying a face plate 66 adapted to be connected to a companion plate on the universal joint or propeller shaft which is connected through the usual rear axle gearing to the axle shafts of the vehicle.

Pinion shaft 64 is carried in a casing part 68 by bearings 70 and 72, and at its inner end is provided with a bevel gear 74 meshing with the bevel pinion 76 keyed or otherwise fixed to sleeve 78. As will be observed from Fig. 1, sleeve 78 is in alignment with the hollow shaft parts 24 and 40 of the hydraulic mechanism and the high speed shaft 46 extends through this sleeve to the clutch G. Sleeve 78 is rotatably mounted in the casing in bearings 80 and 82.

Between the gear 76 and the hydraulic mechanism there is located a mechanical reverse gear indicated generally at J and an overrunning clutch K for transmitting power from the turbine shaft of the hydraulic mechanism to sleeve 78. In the construction shown the reverse gear and overrunning clutch are combined to form a single and axially compact unit which, as will hereinafter be more fully pointed out, is of material importance.

The clutch K is for the purpose of transmitting drive in forward direction from the turbine shaft 40 to sleeve 78 and is of the overrunning type to prevent drive being transmitted from sleeve 78 back to the turbine member. In the construction shown this clutch comprises an inner race 84 and an outer race 86. As shown more clearly in Fig. 2 the inner race 84 is provided with cam surfaces 88 forming, with the outer race, wedge shaped spaces 90 in which are located spring loaded rollers 92. Rollers 92 act to transmit power in one direction from the inner to the outer race and overrun with respect to the outer race 86 to prevent transmission of power from the outer to the inner race when the latter tends to rotate faster than the former.

This clutch thus provides automatic disconnection of the turbine member when the high speed drive is employed, in the same manner as disclosed in Patent No. 1,900,119 previously referred to.

The reverse gear J comprises a gear 94 rotationally fixed on an extension of the inner race ring 84 of the overrunning clutch, which ring is in turn keyed to the hollow shaft part 40 of the turbine member. Gear 94 is in constant mesh with a reversing idler gear 96 carried by shaft 98 (see Fig. 3) mounted in the housing. Gear 96 is in constant mesh with gear 100 fixed on a counter shaft 102, which shaft has fixed thereto a second gear 104.

The forward end of sleeve 78 is enlarged to embrace the bearing 44 and the enlarged forward end of the sleeve is provided with a series of external splines or teeth 106 (Figs. 1 and 4). The portion of the outer race ring 86 of the overrunning clutch K, which is adjacent to the enlarged forward end of the sleeve 78 is provided with similar splines 108. An internally splined shift ring 110 is arranged to be moved axially in the splines 106 and 108 by means of a shift fork 112. The outer periphery of the shift ring 110, to one side of the recess for fork 112, is provided with external teeth forming a gear 114 adapted to mesh with the counter-shaft gear 104, as seen in Fig. 4.

The operation of the reverse gear is as follows: In the position of the apparatus illustrated in Fig. 1, the shift ring 110 provides a direct driving connection for transmitting drive in forward direction from the outer race ring of the overrunning clutch K to the sleeve 78, from which final drive is taken off through the bevel gears 76, 74. As will be observed from Fig. 1, the internal teeth on ring 110 engage both the splines 106 on the sleeve and the splines 108 on the race ring of the overrunning clutch. When the parts are engaged in this manner, the two counter shaft gears 100 and 104 are driven idly by gear 94 through gear 96.

Since the outer clutch race 86 and gear 104, when moving, always rotate in opposite directions, it is apparent that the shift ring must disengage from the race before meshing with the gear, thus providing an intermediate neutral position which breaks all drive connection between the turbine and the sleeve 78.

To obtain reverse, the shift ring 110 is moved to the right from the position shown in Fig. 1 so that the internal splines or teeth are out of engagement with the splines 108 on the clutch ring 86 and the outer teeth 114 are in engagement with the teeth of gear 104 as shown in Fig. 4. In this position of the apparatus, the overrunning clutch K is out of the line of drive and a positive driving connection is established through the train of gears 94, 96, 100, 104 and the external gear 114 on the shift ring, for driving sleeve 78 in the opposite direction of rotation from that of the gear 94 which rotates with the turbine member.

As will be evident from Fig. 1, the complete assembly of both the reverse gear J and the overrunning clutch K is encompassed in an extremely short axial space which is of major importance in an apparatus of the kind intended for rear engine drive in which the motor and transmission unit is set transversely of the vehicle chassis as illustrated in Fig. 14. The importance of this is due to the fact that the width of road vehicles such as buses and trucks is limited by statute and for large vehicles of this character the required size of a motor and transmission unit capable of transmitting the power developed by the motor is such as to make it extremely difficult to secure an overall length of motor and transmission unit short enough to be installed transversely of the vehicle without exceeding the permissible vehicle width.

We will now describe the high speed or direct drive clutch G for effecting direct drive connection between shaft 46 and sleeve 78 carrying the bevel drive gear 76.

Referring now more particularly to Figs. 6 to 11, this clutch comprises a driving member or section 116 mounted for axially shiftable movement on splines 118 at the rearward end of shaft 46. Member 116 is provided with an external groove 120 for the reception of a shift fork 122 (see Fig. 1), the control of which will be described later. The member 116 is also provided with external driving teeth 124 adapted to engage internal teeth 126 formed on the driven section of the clutch, which in the embodiment illustrated constitutes a cup-like member 128 keyed or otherwise rigidly secured to the rearward end of sleeve 78.

For reasons which will be explained later, the teeth 124 and 126 are advantageously formed as shown in Fig. 11, the engaging ends of alternate teeth 124a and 126a respectively of the two sets of teeth projecting beyond the engaging ends of the respective intermediate teeth 124b and 126b of the two sets. Further, the engaging ends of teeth 124a and 126a are rounded as shown in the figure.

Member 116 is further provided with two rings of teeth 130 and 132, in axial alignment with each other as shown in Figs. 8 to 10, and, as shown in these figures, teeth 130 are wider peripherally than teeth 132. Teeth 130 and 132 constitute in effect a single set of shouldered teeth since the portions of the forward faces of teeth 130, which project peripherally beyond the corresponding teeth 132, provide shoulders 134 and 136, the purpose of which will hereinafter appear. The forward ends of teeth 130 are cut so that shoulders 134 and 136 lie in a plane normal to the axis of rotation. Teeth 132 constitute what may be termed pilot teeth while teeth 130 may be termed blocking teeth. Each tooth 132 may, insofar as the operation of the clutch is concerned, be an integral extension of the corresponding tooth 132, the separation illustrated being dictated purely by manufacturing reasons.

The driven member 128 of the clutch has secured therein an annular friction plate 138 preferably of bronze or like metal, which in the present embodiment is restrained against rotation relative to member 128 by engagement of teeth 140 on the plate with the inner ends of the internal teeth 126 on member 128.

An annular member 142, which for convenience may be referred to as a blocking or drag ring, is mounted inside teeth 126 of the driven member 128.

Ring 142 is maintained in constant and relatively light frictional engagement with the friction plate 138 by contact between the friction face 144 on the ring and a complementary face on plate 138. In the embodiment shown in Fig. 6, face 144 is conical but this is not essential. It may be plane as illustrated in Fig. 12.

The desired degree of frictional engagement between parts 138 and 142 is obtained in the embodiment illustrated by an annular wave or spring washer 146 (see also Fig. 6a) which is situated between two bronze washers 148 and 150. Washer 148 has external teeth projecting between teeth 126 on the driven part 128, so that it rotates therewith in the same manner as the friction plate 138, and the surface 152 constitutes a second or auxiliary friction surface between the ring 142 and the driven part 128. The several washers are retained in properly assembled relation by the retaining washer or snap ring 152 seated in suitable recesses in teeth 126.

The blocking ring 142 is provided with a series of internal teeth 154 adapted to mesh with substantially no peripheral play with the teeth 130 on the driving member 116, as shown in Fig. 10. With the position of parts shown in Fig. 6, the pilot teeth 132 are in mesh with the teeth 154 on the blocking ring and as will be observed from Figs. 8 and 9, substantial peripheral clearance is provided between these sets of teeth.

The operation of the clutch is as follows: In the position of the parts shown in Fig. 6 the clutch is disengaged and the driving member 116, constituting the driving section of the clutch, rotates at engine speed, being positively driven through shaft 46, while the driven member or clutch section 128 rotates at a speed proportional to vehicle speed, being positively connected through the final drive line from sleeve 28, to which it is fixed, to the wheels of the vehicle.

If the vehicle is standing still with the engine running, or if it is being driven in the low speed drive provided by the hydraulic mechanism, member 116 will be rotating at higher speed than member 128. Member 116 will carry with it the blocking ring 142 because of the engagement of teeth 132 and teeth 154.

If the direction of rotation of the driving part be assumed to be as shown by arrow 156 (Fig. 9) the pilot teeth 132 will be in engagement with teeth 154 on the blocking ring as shown in Fig. 9, since the friction between the blocking ring, which travels at the same speed as the driving section of the clutch, and the driven section, which is either stationary or moving at lower speed than the driving section, will cause the blocking ring to lag or drag behind the driving section to the extent allowed by the play between teeth 132 and teeth 154.

This is the normal position of the parts when operating in low speed hydraulic drive since as previously pointed out, the characteristics of the hydraulic mechanism are such that the speed of the turbine or driven member of the hydraulic mechanism is lower than engine speed.

If now it is desired to shift to high speed drive by engagement of the high speed clutch, member 116 is shifted to the left from the position shown in Fig. 6. If when this is done the driving member 116 is rotating faster than the driven member 128 and as a result the blocking ring 142 is positioned relative to the driving member as indicated in Fig. 9, member 116 can be shifted only by the small amount required to bring shoulders 134 into abutting contact with the meshing ends of the teeth 154. As previously noted, these shoulders and the meshing ends of teeth 156 are square, that is, they lie in a plane normal to the plane of rotation, and consequently provide a positive stop. The provision of such a positive stop for preventing engagement of the driving teeth (124, 126) of the clutch under the conditions assumed is of primary importance and it is essential to proper operation of the apparatus that these teeth be prevented from coming into engagement under the influence of the clutch engaging pressure alone.

With the clutch thus blocked out of engagement, even though full engaging pressure is exerted on it by the clutch actuating means, it can be released and brought into full engagement only by a condition of vehicle drive which causes the relative speeds of the driving and driven sections of the clutch, 116 and 128 respectively, to cross. The clutch can come into driving engagement only if and when the speed of member 128 becomes greater than that of member 116. This condition of the crossing of the speeds may be brought about either by deceleration of the engine and consequently of the driving section of the clutch through closing the throttle for the shift, or by acceleration of the vehicle (as by coasting down grade) to a speed such that the part 128 rotates at a speed faster than engine speed. The former is, of course, the usual condition.

When the relative speed between the driving and driven sections of the clutch changes so that the speeds of these parts cross, the friction between the blocking ring and the friction plate 138 against which it is pressed by the spring washer 146 will shift the blocking ring peripherally with respect to the driving section to the extent permitted by the play between teeth 132 and 154. In other words, teeth 132 will move to the right relative to teeth 154 from the position shown in Fig. 9. Before this play can be taken up, however, teeth 132 must pass a position in which they are peripherally midway between the teeth 154 (as in Fig. 8). With the blocking ring in midway position relative to the driving section of the clutch, the blocking teeth 130 are in alignment with the spaces between teeth 154 and, the clutch being assumed to be under engaging pressure, the teeth 130 will be free to move into meshing engagement with teeth 154. When this occurs the clutch may be said to be unlocked, and the further engaging movement permitted by the meshing of the teeth 130 and 154 allows the driving teeth 124 and 126 to come into meshing engagement to provide positive drive through the clutch.

It will be evident from the foregoing that the clutch can be unlocked so as to permit its engagement only when the speeds of members 116 and 128 are substantially exactly the same, there being a slight crossing of the speeds required, however, to unlock the clutch. It is to be noted, however, that there is no positive rotational connection between the blocking ring 142 and the driven member 128 so that there is no positive index to insure alignment of teeth 124 with the tooth spaces between teeth 126 when the teeth 130 are brought into meshing alignment with the spaces between teeth 154. Such being the case, when the clutch is unlocked, the driving teeth may meet end to end. It is, under some conditions of drive, possible that the relative speeds of parts 126 and 128 may vary with great rapidity, so that the driving teeth 124 and 126 may be traveling at approximately the same speed for only an instant, as the speeds cross. Consequently, because neither set of driving teeth are rotationally free, one set being connected to the vehicle wheels and the other to the engine, so that it may be said that these teeth are under load, it is essential to satisfactory operation that meshing of teeth 124 and 126 be positively insured at substantially the instant of crossing of the speeds. It is for this reason that alternate teeth 124a and 126a are extended beyond the intermediate teeth and rounded. The rounded ends of the projecting teeth will obviously prevent positive stopping of proper meshing due to initial end to end engagement of the teeth, but it has been found that if the relative speed between these two sets of teeth is changing with great rapidity, even teeth with rounded ends may fail to enter the immediately adjacent tooth spaces and will strike the ends of the next adjacent teeth which will act to prevent meshing if the teeth are all of the same length. If the first tooth space is jumped without meshing, it is likely that jumping of the next tooth space will occur and the result will be failure of the clutch teeth to mesh at all because of the fact that they are on parts the relative speed between which is changing rapidly and the speeds of which have already crossed.

By making the intermediate teeth 124b and 126b shorter than the rounded teeth, the tooth space for securing the initial meshing of the teeth is in effect doubled and it has been found that with this arrangement, reliable meshing of the teeth is assured even if when the clutch is unlocked by relative movement of the blocking ring, the teeth 124a and 126a initially meet end to end.

We have so far considered engagement of the clutch only under a condition in which the clutch is attempted to be engaged when the driving section is rotating faster than the driven section and engagement is effected by the crossing of speeds which occurs when the speed of the driven section catches up with and crosses the speed of the driving section. In so far as the action of the clutch is concerned, it is not essential that engagement be attempted only under these conditions. The action of the clutch will be functionally the same under the opposite condition of relative speeds, that is, with engagement attempted when the driving section is rotating at a lower speed than the driven section.

If while the clutch is disengaged the speed of the driven section exceeds that of the driving section, the friction between the driven section and the blocking ring will carry the latter to a position opposite that shown in Fig. 9, and in such position the shoulders 136 on the blocking teeth will be in alignment with the meshing ends of the teeth 154 on the blocking ring. Under such conditions any attempt to bring the clutch into driving engagement will be prevented by shoulders 136 until reduction of speed of the driven section relative to that of the driving section causes the two speeds to cross. Crossing of the speeds in this fashion will cause the blocking ring to be shifted from right to left as viewed in Fig. 9, from its assumed position toward the position shown in Fig. 9. Such shift will bring the blocking ring to a mid position, as the speeds cross, which permits the clutch to be engaged.

While the arrangement of parts shown in Fig. 6 is preferred, the design may be altered considerably while still retaining the same principles of operation. In Fig. 12 another form of construction is shown wherein the operation is as above described, but in which the driving section 116a is fixed to the drive shaft 46 and the driven section 128a, carrying the blocking ring, is axially shiftable on splines 158 on sleeve 78. In the present form the friction surface 144a of the blocking ring is shown plane, rather than conical as in Fig. 6. The only advantage of the conical form is that with a conical surface more friction contact area may be obtained with parts of given diameter.

It will be noted that in either the form of construction shown in Fig. 6 or Fig. 12, the blocking ring is in frictionally moving contact with the driven section of the clutch whenever the clutch is out of engagement and the two sections are turning at different speeds, since the blocking ring turns at the same speed as the driving section. The friction contact is relatively light however, and the power loss and wear is negligible. Also the minor amount of heat resulting from the friction is readily dissipated by radiation and through the lubricant.

The reason for the introduction of the friction contact between the blocking ring and the clutch section (in this case the driven section) with respect to which it may have relative rotational speed when the clutch is disengaged, is to insure that the blocking ring is moved to the midway position of its play with respect to the section with which it rotates only by crossing of the speeds of the two sections, so that the clutch will be unlocked only at the instant when the speeds are substantially synchronous. This must be insured under all possible conditions of drive if the clutch is to give satisfactory service, but would not necessarily be the case if the friction contact were not employed.

To illustrate this, let it be assumed that the spring washer 146 is omitted so that the blocking ring is not held in friction contact with plate 138 when the clutch is disengaged. Let is further be assumed that it is desired to shift from low speed to high speed drive and that the vehicle operator closes the throttle quickly and then actuates the clutch engaging mechanism to engage the high speed clutch. On sudden closing of the throttle, the engine, particularly if it is an internal combustion engine operating at high speed at the time of throttle closure, will decelerate very rapidly and the inertia of the blocking ring 142, which is carried by the part 116, may cause this ring to shift from the position shown in Fig. 9 to the opposite limiting position permitted by the play between teeth 132 and 154. Deceleration sufficient to cause this may readily occur with the driving part of the clutch still turning at a speed much greater than the driven part of the clutch.

Under this assumed condition, shoulders 136 on teeth 130 will be brought into engagement with teeth 154. The engagement of the blocking shoulders 136 on the teeth 154 will act to force the blocking ring into frictional contact with the friction plate and the slower speed of the friction plate will cause the blocking ring to be shifted back to the position shown in Fig. 9. In making this shift, the blocking ring will pass the mid-position which permits meshing of teeth 130 and 154 but this condition will not be brought about by synchronization and crossing of the speeds of the driving and driven clutch sections. It will be remembered that under the conditions now assumed, the driving section is rotating faster than the driven section and the difference in speeds between these sections at the time when the improperly placed blocking ring is brought back to its proper position by friction introduced by the pressure of the blocking shoulders, may be several hundred revolutions per minute. The result will, of course, be a heavy clash, assuming the parts to be under load. It is to correct this possible condition that the friction between the blocking ring and the driven section is employed. This friction overcomes any tendency of the blocking ring to be shifted to the wrong position due to inertia forces, prior to engagement of the clutch.

It will be remembered that previously a condition was described under which the blocking ring was carried by friction to a position opposite that shown in Fig. 9, so that shoulders 136 came into contact with teeth 154 when clutch engagement was attempted. In that case however, in contrast with the case just described, the driven section was assumed to be rotating faster than the driving section. For that condition, blocking of clutch engagement by contact of the shoulders 136 represents correct position of the blocking ring prior to engagement, while for the condition of the driven section rotating more slowly than the driving section prior to engagement, the correct position of the blocking ring is with shoulders 134 in line with teeth 154. It will thus be seen that the correct position of the blocking ring with respect to the section with which it rotates depends upon which of the clutch sections is rotating the faster prior to attempted clutch engagement.

In some cases, particularly for large clutches or for very high speed clutches where the parts may be either relatively heavy or subjected to high rates of acceleration or deceleration, so that the possible inertia forces may be large, the friction necessary to prevent shifting of the blocking ring to an incorrect position due to such forces may be too great to be advantageously applied constantly, as in the embodiments hereinbefore described.

In such instances, a form of construction such as shown in Fig. 13 may advantageously be used. In this embodiment the blocking ring 142a is held in position directly by the snap ring 152, so that it can turn freely relative to the friction plate 138. Further, certain of the teeth 154 are bevelled radially at their meshing ends as at 154a.

The driving section is provided with a series of differential bores 160 arranged radially and distributed to correspond with the beveled teeth 154a. In each of these bores a poppet 162 is located, the poppet having a rounded end projecting to come into engagement with a beveled tooth 154a and being loaded by a light spring 164.

When the clutch is out of engagement poppets 162 are out of engagement with teeth 154a; but by reference to the drawings it will be seen that when the clutch is actuated for engagement the poppets come into contact with the teeth on the blocking ring before the blocking shoulders on teeth 130 can engage the ring. The prior contact of the poppets exerts axial force on the blocking ring, thus producing friction between the ring and the friction plate equivalent to the friction constantly produced by the spring washer 146 in the forms of construction previously described. The friction produced by the poppets is not required if the blocking ring is in proper position at the time the clutch is actuated, but if the blocking ring happens at such time to be in improper position, due to inertia forces or for any other reason, the friction produced by the poppets will shift the ring to proper position before the blocking shoulders come into contact, thus insuring that the clutch will be engaged only upon crossing of the relative speeds of the driving and driven sections of the clutch.

It is to be noted that in the type of clutch in which light friction pressure is imposed on the blocking ring by the wave type spring washer or any other form of spring having the equivalent function, the blocking ring is under the influence of two types of friction. The first friction is a light frictional drag the amount of which has a minimum value necessary to overcome the inertia of the blocking ring so that this blocking ring will decelerate as rapidly as the section of the clutch with which it rotates can be decelerated, or will accelerate as fast as such section can be accelerated. In other words, this frictional drag which is imposed on the blocking ring is such that the blocking ring will follow the movements of the section with which it rotates through any motions that may be imposed on such section at any time when the clutch is disengaged. The second type of friction is that which is produced when engaging force is applied to the clutch to bring it to its intermediate or blocked position. The engaging force brings the blocking shoulders into contact and the load of the engaging force is transmitted across the blocking ring to produce a larger frictional force than that produced by the spring washer. This larger frictional force serves to move the blocking ring to unlock the clutch when the speeds of the two sections of the device cross.

Thus the function of the lighter friction produced by the spring washer is preliminary. Its purpose is always to keep the blocking parts in the proper phase relation so that they will lock regardless of when the clutch is actuated. The purpose of the heavier friction produced as a result of actuation of the clutch and the resultant blocking is to unlock the clutch at the correct instant when the speeds of the two sections cross. It will, of course, be evident that other forms of light springs such as coil or leaf springs or the like may be used to produce the preliminary friction in place of the wave type of spring washer. The latter form is, however, advantageous from the standpoint of conservation of space.

In the form of clutch in which the spring loaded poppets are employed, the action is in general similar, with the spring poppets producing the preliminary friction for insuring proper phase relation between the blocking ring and the clutch section which carries it, and with the second and heavier friction load produced by the blocking engagement of the shoulders serving to shift the position of the blocking ring when the speeds of the sections cross, to unlock the clutch and permit its full engagement.

The advantage of the poppet type of construction is substantial elimination of friction during periods of clutch disengagement when the clutch sections are rotating at different speeds. On the other hand, the form of clutch in which the preliminary friction is produced by constantly acting spring pressure, insures the blocking ring being always in proper phase relation with the clutch section with which it rotates. This is of some advantage as compared with the other form for the reason that if the blocking ring is free to move out of proper phase relation and is subsequently returned to proper phase relation by the action of poppets which engage it as the initial event in clutch engagement to produce the preliminary friction, the abrupt movement of the blocking ring from one terminal position to another may possibly produce an undesirable shock load on the pilot teeth. Also, it will be readily apparent from comparison of the structures shown in Figs. 6 and 13 that the form of clutch in which continuous light friction is imposed on the blocking ring to maintain it in proper phase relation is simpler and cheaper to manufacture than the form in which the ring is free and is brought into proper phase relation by preliminary pressure exerted through the spring loaded poppets. Consequently, the form in which constant preliminary friction is imposed on the blocking ring is in most cases to be preferred, although both forms have been found from experience to operate successfully in actual vehicle operation.

While for purposes of illustrating the principles of the clutch construction, forms have been shown in which the blocking ring rotates with the driving section, it will be evident from the foregoing description that insofar as the engaging operation of the clutch is concerned the section with which the blocking ring rotates may be either driving or driven. It will also be evident that insofar as the functioning of the clutch is concerned it is immaterial whether the pilot and blocking teeth are carried on a driving or driven clutch section or on the blocking ring.

The high speed clutch G may of course be actuated in any desired manner but when the clutch is incorporated in vehicle drives of the kind herein described, the kind of actuating mechanism illustrated in Fig. 1 has been found to be particularly advantageous. In this mechanism the shift fork 122 has fixed to it a sliding pin 166 around which is located a spring 168 compressed between a suitable collar on the pin and a part of the casing. The tension on spring 168 is such as to constantly tend to keep the clutch in engagement. This tendency of spring 168 to engage the clutch is over-balanced by the pressure of a lever 170 pivoted at 172 in the casing and bearing against a suitable abutment on the shift fork. The pressure exerted by lever 170 is derived from a spring 174 mounted in a fixed cylinder 176 and compressed between a piston 178 and one end of the cylinder. Piston 178 is connected to the lever 170 by means of a link 180, and spring 174, being stronger than spring 168, operates to over-balance the latter spring and maintain the clutch in disengaged position as shown in Fig. 1.

Cylinder 176 provides a pressure chamber 180 on the side of piston 178 opposite spring 174, which chamber is adapted to be supplied with fluid under pressure such as compressed air, oil or the like through connection 182, under the control of the operator of the apparatus. As will be evident from the drawings, admission of pressure fluid to the chamber 180 to move piston 178 to the right against the action of spring 174 will relieve the shift ring of the pressure exerted by lever 170 and permit spring 168 to actuate the clutch. It has been found from experience in actual vehicle operation that the high speed clutch G operates most satisfactorily when constant engaging pressure is applied to the section of the clutch which is shifted and with the above described actuating arrangement this desirable condition is achieved. The use of a spring 168 to apply the engaging pressure eliminates possibility of material variations in such pressure which would be likely to occur if engagement were effected by manual operation or by a direct application of pressure fluid, the value of the pressure of which might vary.

Many practical advantages are obtained from the transmission construction forming the subject matter of the present invention, of which the following are particularly to be noted.

By providing a positive acting high speed clutch, clutch wear is substantially entirely eliminated in the transmission as a whole. The reason for this is that substantially no wear occurs on the friction clutch which connects the engine to the hydraulic converter. Due to the yielding nature of the hydraulic drive the friction clutch, by its engagement, does not have to pick up the load of the vehicle, since at low engine speed the pump of the converter may rotate while the turbine member remains stationary. Since the high speed clutch is of the positive acting type and can be engaged only when the parts are substantially synchronized as to speed, this clutch is not subject to the wear of a friction clutch. In transmissions of the general type under discussion but in which a friction clutch is used as the high speed clutch, as in U. S. Patent 1,900,119 previously referred to, the high speed clutch is subject to wear since this clutch must slip to a certain extent on each engagement, unless by chance it is engaged when the engine speed is exactly synchronized with the driven shaft speed.

The positive acting high speed clutch, which can be engaged only when the speeds of the driving and driven parts cross each other, provides a very important practical operating advantage in a vehicle drive as compared with a high speed clutch of the friction type which may be engaged at any time. In an apparatus of the kind under consideration, the normal sequence of events in starting a vehicle is to first engage the friction clutch to start the vehicle in hydraulic drive and to then accelerate in this drive until a suitable speed is reached for shift to high speed drive. It is characteristic of the torque converter that the turbine member does not rotate as rapidly as the pump and in a typical case the shift to high speed drive is made at a time when the turbine member has reached a speed not over approximately two-thirds of the engine speed. The speed of the driven elements of the drive line to the vehicle wheels just prior to the instant of the shift corresponds to the speed of the turbine member, but just at the instant before shifting speeds, the engine to which these driven elements are to be connected when the shift is made in rotating at much higher speed. If, after the converter is disconnected, the high speed connection is made through a friction clutch and the engine has not had time to decelerate to a speed corresponding to the speed of the driven elements connected to the driving wheels, engagement of the high speed clutch will produce a very noticeable surge in the forward movement of the vehicle. If the operator should be careless and not close his throttle when the converter clutch is released preparatory to shifting, the surge resulting from engaging a high speed clutch of the friction type may be very bad because of the coupling of the driving wheels of the vehicle to a racing engine. With a positive acting high speed clutch which can engage only when the vehicle and engine speeds cross, all possibility of such surges is eliminated since it is impossible for the clutch to engage until deceleration of the engine has brought its speed down to the speed corresponding to the speed of the vehicle at the time the high speed clutch goes into engagement.

The separated arrangement of the clutches in the present construction is also of material advantage in that the direct drive clutch is freely accessible, and this advantage applies whether this clutch is of the positive acting type or the friction type.

A further advantage of the positive acting clutch in a transmission of the kind illustrated in its comparatively small size and weight as compared with a friction clutch capable of transmitting the same amount of power under the conditions imposed. This contributes a material saving in weight and cost, both of which are important considerations, and the extent of the difference in size will be readily apparent from Fig. 1, which shows these parts in true relative proportion for a practical automotive installation.

As previously pointed out the specific reverse gear construction employed is highly advantageous from the standpoint of obtaining axial compactness of the transmission as a whole and this important consideration is further contributed to by the small dimensions of the positive acting high speed clutch when it is incorporated in vehicle transmission provided with an angle drive. As will readily be observed from Fig. 1 the small diameter of the clutch G permits this clutch to be located so that it does not project axially by any substantial amount beyond the bevel gear through which the angle drive is taken. It will be equally evident that if a friction clutch were used in place of the clutch G, such a clutch would have to have a diameter of the same order as that of the friction clutch 14, and the length of the transmission would have to be increased to permit such clutch to clear the angle drive gear.

The positive action high speed clutch has the further operating advantage of protecting engine and drive line from undue stress or shock of the kind which might be imposed by an operator attempting to start a vehicle in high speed drive. This might be done with a high speed clutch of the friction type, but the present form of clutch requires crossing of the speeds of the driving and driven parts of the clutch before driving engagement can be effected, and as long as the vehicle is stationary no such crossing of speeds can occur. The present clutch will also prevent shift to high speed drive at unduly low vehicle speed. For the clutch to engage, the driving part of the clutch must decelerate from a speed greater than that of the driven part to a speed less than that of the driven part, in order to secure the required crossing of speeds. From this it follows that if engagement is attempted at unduly low vehicle speed, the clutch will not engage because of the fact that the driving section would have to decelerate to a speed below that permitted by the idling speed of the engine in order to secure the required crossing of speeds.

It will be evident that without departing from the principle of the invention in its several aspects the structures hereinbefore described may be altered in many specifically different ways and it will further be evident that certain features of the invention may be utilized to the exclusion of others. It is accordingly to be understood that the invention is intended to embrace all forms of construction falling within the scope of the appended claims when they are construed as broadly as the state of the prior art permits.

We claim:

1. In a variable speed power transmission for transmitting power from a source of power to a driven element, hydraulic power transmitting mechanism for effecting variable speed drive from said driving shaft to said driven shaft, a first clutch for selectively transmitting power through said hydraulic mechanism, said clutch being located between said hydraulic mechanism and said source of power, and means providing a direct drive between said source of power and said driven element, said means including a releasable direct drive clutch located at the side of said hydraulic mechanism opposite said first clutch.

2. A variable speed power transmission including hydraulic variable speed power transmitting mechanism and a high speed drive mechanism, said hydraulic mechanism comprising a driving member and a driven member each having a hollow shaft part and said hollow shaft parts being in axial alignment to provide a passage therethrough, a hollow sleeve member rotatably mounted in axial alignment with said hollow shaft parts, a power shaft extending through said aligned hollow members, a releasable clutch for selectively transmitting power from said power shaft to said sleeve member, a releasable clutch for selectively transmitting power to the driving member of said hydraulic mechanism, a releasable clutch for transmitting drive from the driven member of said hydraulic mechanism to said sleeve member, and means located externally of said sleeve member between the first mentioned clutch and the last mentioned clutch for transmitting power to a driven element.

3. In a power transmission, hydraulic mechanism providing a low speed drive, said mechanism including a turbine member having a hollow shaft part, said turbine member being capable of delivering power in one direction of rotation only, a sleeve member mounted in axial alignment with said shaft part, said sleeve constituting the member from which power is delivered by the transmission, means including a reverse gear for transmitting power selectively in either direction of rotation to the portion of the sleeve member adjacent to said turbine member, a high speed drive shaft extending through said turbine member and said sleeve member, and means for selectively connecting said drive shaft to a portion of said sleeve member remote from said turbine member.

4. In a power transmission for angle drive to a vehicle axle, hydraulic mechanism providing a low speed drive, said mechanism including a turbine member having a hollow shaft part, said turbine member being capable of delivering power in one direction of rotation only, a sleeve member mounted in axial alignment with said shaft part, means including reverse gear mechanism situated between the turbine member and the adjacent end of said sleeve member for selectively transmitting power in either direction of rotation from the turbine member to the sleeve member, a bevel pinion on said sleeve, a bevel gear for angle drive meshing with said pinion, said gear lying on the side of the pinion remote from said turbine member, a high speed shaft extending through said turbine member and said sleeve member, and a releasable clutch for selectively transmitting power from said high speed shaft to the end of the sleeve remote from the turbine member, said clutch being positioned substantially entirely between the same limits axially of the transmission as said bevel gear.

5. In a power transmission having a high speed drive and a variable-speed low speed drive including a driven member capable of transmitting power in one direction of rotation only and having a shaft part, a power take-off member mounted in alignment with said shaft part, an overrunning clutch having a driving part fixed to said shaft part and a driven part adjacent to said power take-off member, a shift member rotationally fixed and axially shiftable on said power take-off member for selectively coupling and uncoupling the driven part of said clutch and the power take-off member, means for selectively transmitting power through said high speed drive to said power take-off member in the same direction of rotation as through said overrunning clutch, and gearing for selectively transmitting drive in reverse direction from said driven member to the power take-off member, said gearing including a gear fixed on the shaft part of said driven member, intermediate gears including a gear rotating reversely with respect to the first mentioned gear, and a gear on said shift member arranged to mesh with said reversely rotating gear after the shift member is moved to a position in which said driven member and said power take-off member are uncoupled.

6. In a power transmission having a high speed drive and a variable-speed low speed drive including a driven member capable of transmitting power in one direction of rotation only and having a shaft part, a power take-off member mounted in alignment with said shaft part, an overrunning clutch having a driving part fixed to said shaft part and a driven part adjacent to said power take-off member, the driven part of the clutch and the adjacent end of the power take-off member having teeth thereon, a shift member having internal teeth engaging the teeth on the power take-off member and arranged to shift into and out of engagement with the teeth on the driven part of the clutch, means for selectively transmitting power through said high speed drive to said power take-off member in the same direction of rotation as through said overrunning clutch, and gearing for selectively transmitting drive in reverse direction from said driven to the power take-off member, said gearing including a gear fixed on the shaft of said driven member, intermediate gears including a gear rotating reversely with respect to the first mentioned gear, and a gear on said shift member for engaging said reversely rotating gear only when said shift member is shifted out of engagement with the driven part of the clutch, and said shift member having an intermediate neutral position in which it engages neither the driven part of the clutch nor said reversely rotating gear.

7. In a hydraulic variable speed transmission having a turbine member for transmitting power in one direction only, mechanism for selectively transmitting power in either direction of rotation to a driven element, an overrunning clutch comprising an inner member operatively fixed to said turbine member, an outer member and detents for transmitting power from the inner member to the outer member in one direction of rotation only, reverse gear mechanism including a driving gear fixed to said turbine member and a shift member shiftable to transmit drive in reverse direction to said driven element, said shift member providing a driving connection between the outer member of said clutch and said driven element when out of driving engagement with the driving gear of the reverse mechanism, and being shiftable to break the driving connection between said outer clutch member and said driven element when drive in reverse direction is being effected.

8. In motor vehicle drives in combination, a drive shaft, a driven shaft, a driving mechanism therebetween comprising a fluid torque converter capable of multiplying torque at reduced speeds cooperating with a gear assembly for effecting forward and reverse drives embodying a free-wheel clutch operative to drive at forward speeds only, a driven member concentric with said drive shaft geared to said driven shaft and constituting the power-output of said mechanism, alternately operative clutch members adapted to connect said drive shaft and said driven member directly, or through said converter and said gearing, and control means for said clutch members effective to establish said alternate drive between said drive shaft and said member.

CARL D. PETERSON.
ALBERT H. DEIMEL.